United States Patent [19]

Tanaka et al.

[11] Patent Number: 5,133,332
[45] Date of Patent: Jul. 28, 1992

[54] DIAMOND TOOL

[75] Inventors: Katsuyuki Tanaka; Akito Yoshida; Nobuo Urakawa; Kazuwo Tsuji, all of Itami, Japan

[73] Assignee: Sumitomo Electric Industries, Ltd., Osaka, Japan

[21] Appl. No.: 758,705

[22] Filed: Sep. 9, 1991

Related U.S. Application Data

[63] Continuation of Ser. No. 537,626, Jun. 13, 1990, abandoned.

[30] Foreign Application Priority Data

| Jun. 15, 1989 | [JP] | Japan | 1-153126 |
| Sep. 18, 1989 | [JP] | Japan | 1-242628 |
| Nov. 30, 1989 | [JP] | Japan | 1-311570 |

[51] Int. Cl.$^5$ ............................................. B28D 5/04
[52] U.S. Cl. ........................................ 125/39; 51/293; 407/119; 407/118; 76/DIG. 12
[58] Field of Search ............... 51/307, 293, DIG. 30, 51/204 R, 295; 125/36, 39; 76/DIG. 12, 101.1; 407/119, 118

[56] References Cited

U.S. PATENT DOCUMENTS

| 2,855,316 | 10/1958 | Taylor | 501/96 |
| 4,252,102 | 2/1981 | Phaal et al. | 125/29 |
| 4,268,276 | 5/1981 | Bovenkeck | 51/307 |
| 4,301,134 | 11/1981 | Strong | 423/446 |
| 4,619,563 | 10/1986 | Doting | 76/101.1 |

Primary Examiner—M. Rachuba
Attorney, Agent, or Firm—Wenderoth, Lind & Ponack

[57] ABSTRACT

A diamond tool, e.g., cutting tool, dresser, wire drawing die, etc., having excellent wear resistance, heat resistance and oxidation resistance and with an improved tool life is provided, which is mainly composed of a synthetic diamond single crystal containing boron or boron and nitrogen.

3 Claims, 4 Drawing Sheets

DIAMOND TOOL

This application is a continuation of now abandoned application, Ser. No. 07/537,626 filed Jun. 13, 1990.

BACKGROUND OF THE INVENTION

1. Field of the Invention

This invention relates to a diamond tool, in particular, a diamond cutting tool, a diamond dresser used for forming and dressing a grinding wheel, or a wire drawing die and more particularly, it is concerned with a synthetic diamond single crystal cutting tool used for precision machining or super-precision machining for cutting nonferrous metals such as aluminum and copper and soft materials such as plastics with high precision.

2. Description of the Prior Art

Natural diamond or synthetic diamond has been used as a diamond single crystal for tools, e.g. precision or super-precision cutting tools, and such diamond contains nitrogen as an impurity but no boron.

In the precision machining or super-precision machining for cutting nonferrous metals such as aluminum and copper or soft materials such as plastics with high precision using a diamond cutting tool, there arises a problem that the diamond cutting tool tends to wear and its life is short. During cutting, the edge part of the cutting tool wears so that the surface smoothness of the cut of a workpiece is deteriorated and the cutting resistance is increased, thus shortening the life of the cutting tool.

Figure 5:
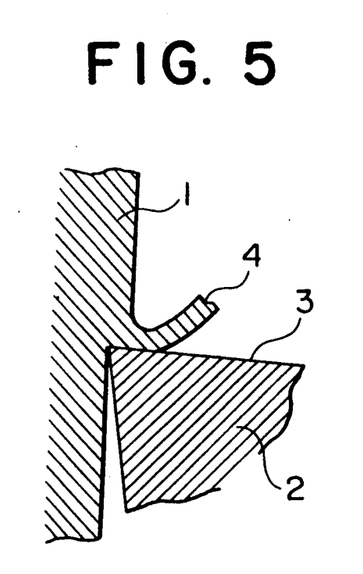
FIG. 5 is a cross-sectional view of a diamond cutting tool to illustrate the cutting state of the cutting tool.
Figure 6:
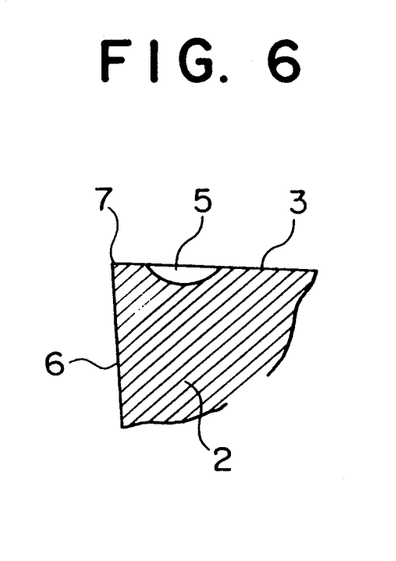
FIG. 6 is a cross-sectional view of a diamond cutting tool to show the crater depth and FIG. 7 is a cross-sectional view of a diamond cutting tool to show the edge wear.

When a workpiece 1 of a soft material is cut by a diamond cutting tool 2 as shown in FIG. 5, a cut chip 4 slides continuously at a high speed in contact with a rake face 3 of the diamond cutting tool 2 and the rake face 3 is partially oxidized by the friction heat generated during the same time and the heat of the chip 4 itself which is heated at about 300° to 400° C., to produce a crater depth 5 as shown in FIG. 6. If the crater depth 5 is increased, it is hard for the chip 4 to slide on the rake face 3 and this tends to scratch the surface of the workpiece, thus resulting in deterioration of the surface smoothness thereof.

Figure 7:
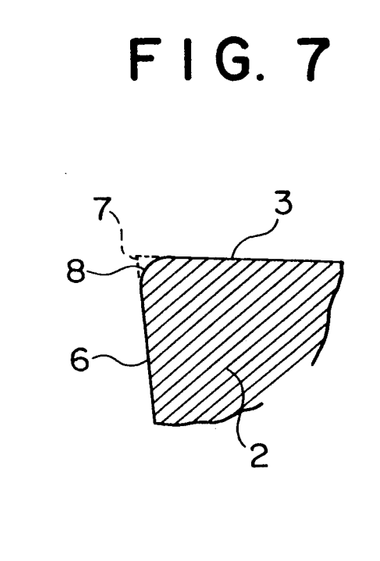

An edge part 7 of the diamond cutting tool 2 is also worn by the heat of friction with the workpiece 1 resulting in mechanical wearing as shown by 8 in FIG. 7, so that the cutting resistance is increased and a desired cutting precision is hardly obtained. In diamond dressers and wire drawing dies, similarly, a desired shape precision or wire drawing precision is hardly obtained by such wearing.

On the other hand, synthesis of a large-sized diamond single crystal used as a diamond cutting tool has generally been carried out by the temperature gradient method wherein a single crystal is grown on seed crystal, as disclosed, for example, in U.S. Pat. Nos. 3,297,407, 4,034,066 and 4,073,380 and Japanese Patent Laid-Open Publication No. 88289/1977. It has been known for a long time that the diamond single crystals synthesized by these methods contain nitrogen as an impurity from raw materials.

A technique of adding boron to synthetic diamond single crystals has hitherto been disclosed in U.S. Pat. Nos. 4,042,673 and 4,082,185. In this case, however, the addition of boron is carried out for the purpose of converting diamond into an n-type semiconductor or yielding blue color diamond for decoration, but no study as to the addition of boron has been made in the relationship with cutting properties in the field of tools.

Furthermore, there has been proposed a diamond single crystal whose resistivity is lowered by adding boron so as to provide a diamond tool in such a manner as to precisely work the diamond single crystal in a desired shape with a high efficiency through discharge working (Japanese Patent Laid-Open Publication No. 126003/1983), but this is not directed to improvement of the mechanical properties.

In the case of cutting a workpiece of aluminum, copper or plastics by a diamond cutting tool, for example, wearing of the edge part of the cutting tool has hitherto occurred during cutting so that the surface smoothness of the workpiece cut is deteriorated and the cutting resistance is increased, thus shortening the life of the cutting tool. Diamond dressers or wire drawing dies have similarly lost their useful life through wearing.

SUMMARY OF THE INVENTION

It is an object of the present invention to provide a diamond tool excellent in wear resistance, heat resistance and oxidation resistance.

It is another object of the present invention to provide a diamond tool with a decreased wear in cutting soft materials with a high precision, dressing a grinding wheel, drawing a wire, etc. and with an improved tool life as compared with that of the prior art.

It is a further object of the present invention to provide a synthetic diamond single crystal containing boron, suitable for use as, in particular, cutting tools, dressers, wire drawing dies, etc.

These objects can be attained by a diamond tool composed of a synthetic diamond single crystal containing boron and optionally nitrogen, preferably the content of boron being 0.1 to 500 ppm and that of nitrogen being 1 to 500 ppm.

BRIEF DESCRIPTION OF THE DRAWINGS

The accompanying drawings illustrate in detail the principle and merits of the present invention.

FIGS. 1 (a) and (b), FIGS. 2 (a) and (b) and FIGS. 3 (a) and (b) are respectively plan views and cross-sectional views of the diamond cutting tools of the present invention.

DETAILED DESCRIPTION OF THE INVENTION

The inventors have made studies on the mechanism of occurrence of crater wear, or edge wear in a diamond cutting tool during cutting non-ferrous materials and plastics and have come to a conclusion that if the wear resistance, heat resistance and oxidation resistance of a diamond cutting tool are improved, the above described wear can be reduced to lengthen the life of the tool, and in a similar manner, the life of a single crystal diamond dresser or wire drawing die, which needs wear resistance, can be lengthened. Thus, we have conducted thorough research as to the relationship between the wear resistance, heat resistance and oxidation resistance of a synthetic diamond single crystal and the impurities contained therein, in particular, nitrogen and boron, which has hitherto not been apparent.

Consequently, it is found that when the synthetic diamond single crystal contains nitrogen, the wear resistance thereof is improved and when containing boron, the heat resistance and oxidation resistance are more improved than when containing no boron. Based on this finding, a diamond tool with a reduced tool wear, e.g. crater depth or edge wear, and with a longer life can be attained by simultaneously adding predetermined amounts of nitrogen and boron.

In the diamond cutting tool, for example, the tool wear can be reduced and its life can be lengthened by preventing the diamond material from oxidation wear due to wearing heat and mechanical wear caused by flowing of the chip at a high temperature and high speed, which occur during cutting a workpiece by the cutting tool, on the rake face, and by contact of the edge part with a finished surface.

Accordingly, the present invention provides a diamond tool composed of a synthetic diamond single crystal containing boron or boron and nitrogen, in general, the content of boron being 0.1 to 500 ppm, preferably 0.1 to 100 ppm, more preferably 10 to 100 ppm, and that of nitrogen being 1 to 500 ppm, preferably 3 to 100 ppm. The present invention aims at improving the wear resistance of the material of a synthetic diamond crystal by incorporating 1 to 500 ppm of nitrogen in the synthetic diamond crystal and improving the heat resistance and oxidation resistance thereof by incorporating 0.1 to 500 ppm of boron therein, thus lengthening the life of the diamond tool. If the content of nitrogen is less than 1 ppm, the wear resistance is too small and if the content of boron is less than 0.1 ppm, the heat resistance and oxidation resistance are too small, to maintain the effect of lengthening the life of the tool. On the other hand, if the content of nitrogen exceeds 500 ppm, the wear resistance is lowered and if the content of boron exceeds 500 ppm, the diamond single crystal is too brittle to work the edge part. Therefore, it is preferred to adjust the content of nitrogen to 1 to 500 ppm and that of boron to 0.1 to 500 ppm.

Improvement of the wear resistance can be found when the content of nitrogen is in the range of 1 to 500 ppm, but in a more preferable embodiment of the present invention, it is in the range of 3 to 100 ppm. When the content of nitrogen is less than 3 ppm, the growth speed of diamond is largely lowered by the presence of a nitrogen getter to suppress contamination with nitrogen and the production cost is increased by 5 times or more. When the content of nitrogen exceeds 100 ppm, a solvent metal tends to be incorporated in diamond single crystal as an impurity and accordingly, it is hard to obtain a good quality diamond single crystal suitable for use as a cutting tool. This means that the yield of a good quality diamond single crystal for use as a cutting tool is decreased and from an economical point of view, the production cost is increased by about 3 to 10 times, which is uneconomical.

The effects on the heat resistance and oxidation resistance can be found when the content of boron is in the range of 0.1 to 500 ppm. When the content of boron exceeds 500 ppm, the diamond single crystal is too brittle to work the edge part, and when exceeding 100 ppm, a solvent metal tends to be incorporated in the diamond single crystal as an impurity, as in the case of nitrogen, and accordingly, it is hard to obtain a good quality diamond single crystal for a cutting tool. In addition, because of lowering of the yield, the production cost is increased by about 3 to 10 times. In a more preferable embodiment of the present invention, therefore, the content of boron is in the range of 0.1 to 100 ppm, in particular, 10 to 100 ppm.

In the present invention, incorporation of boron and nitrogen in diamond single crystals is, for example, carried out by adding elementary boron and iron nitride respectively to raw materials used for the synthesis of diamond single crystals.

In the present invention, determination of boron is generally carried out by irradiating diamond with oxygen or argon ions to generate ions and subjecting the ions to a mass spectrometer using a Secondary Ion Mass Spectrometer (SIMS).

When using a cutting tool for cutting metallic materials, the cutting tool should preferably have low reactivity with a workpiece to be cut in addition to the above described wear resistance, because the temperature becomes very high at the contact point of the cutting tool with the workpiece.

Wear resisting tools such as wire drawing dies are generally used at or near room temperature because of using lubricants and thus the wear resistance at low temperatures is particularly important.

On the other hand, dressers are generally used for cutting materials containing high hardness materials such as grinding wheels, etc. Since the high hardness materials of this kind contain ordinarily fine powders, the dressers often encounter fine breakage and cannot be put to practical use. Therefore, diamond suitable for use as a dresser should be a material capable of resisting fine breakages.

It is found that the diamond single crystal of the present invention is capable of thoroughly satisfying the above described various properties.

The boron-containing or nitrogen and boron-containing synthetic diamond single crystal tool according to the present invention is more excellent in wear resistance, heat resistance and oxidation resistance than a nitrogen-free or boron-free diamond single crystal tool. In a cutting tool composed of the synthetic diamond single crystal of the present invention, therefore, the mechanical wearing due to friction with chips during cutting, and the wearing due to oxidation phenomenon can markedly be reduced and accordingly, such a cutting tool can effectively be applied to a use such that the life of the tool is lengthened by minimizing the tool wearing in the field of precision cutting tools, super-precision cutting tools, etc. Furthermore, in dressers and wire-drawing dies, the tool wearing due to mechanical contact and the oxidation of diamond material due to friction heat generated through contact of the tool with a finished surface can effectively be prevented by the use of the synthetic diamond single crystal of the present invention, thereby lengthening the life of the tool.

The following examples are given in order to illustrate the present invention in detail without limiting the same.

EXAMPLE 1

Figures 1A, 1B:
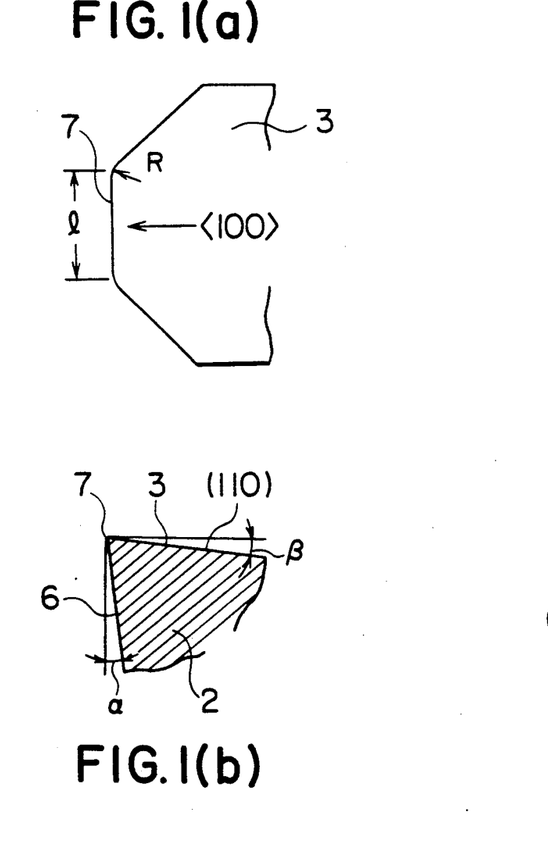

Four kinds of materials were used, i.e. a synthetic diamond single crystal containing 100 ppm of nitrogen and 300 ppm of boron, synthetic diamond single crystal containing 100 ppm of nitrogen and no boron, synthetic diamond single crystal containing no nitrogen but containing 300 ppm of boron, and synthetic diamond single crystal containing no nitrogen nor boron. Using these materials, super-precision cutting tools with a rake angle β of 0°, relief angle α of 5°, edge width 1 of 1.2 mm, nose R of 0.4 mm, rake face 3 orientation of (110) plane and edge direction (orientation or direction towards the cutting edge) of <100> were prepared as shown in FIGS. 1 (a) and (b) and subjected to wet turning of the end surface of a workpiece of aluminum alloy A 5086-Japanese Industrial Standard-with an outer diameter of 150 mm, inner diameter of 20 mm and thickness of 30 mm under conditions of a cutting speed of 113 m/min (inner diameter)–848 m/min (outer diameter), depth of cut of 0.01 mm and feed of 0.03 mm/rev until the surface roughness of the cut surface became 0.04 μm Rmax, after which the life of the tool was evaluated. The test results are shown in Table 1:

TABLE 1

| | Cutting Distance Until Expired (km) | | | |
|---|---|---|---|---|
| Test No. | Sample Containing 100 ppm N and 300 ppm B | Sample Containing 100 ppm N and No B | Sample Containing No N and 300 ppm B | Sample Containing No N Nor B |
| 1 | 890 | 490 | 750 | 400 |
| 2 | 930 | 540 | 800 | 430 |
| 3 | 1010 | 620 | 800 | 490 |
| 4 | 990 | 590 | 700 | 250 |
| 5 | 1080 | 450 | 850 | 300 |
| Average | 980 | 538 | 780 | 374 |

EXAMPLE 2

Figures 2A, 2B:
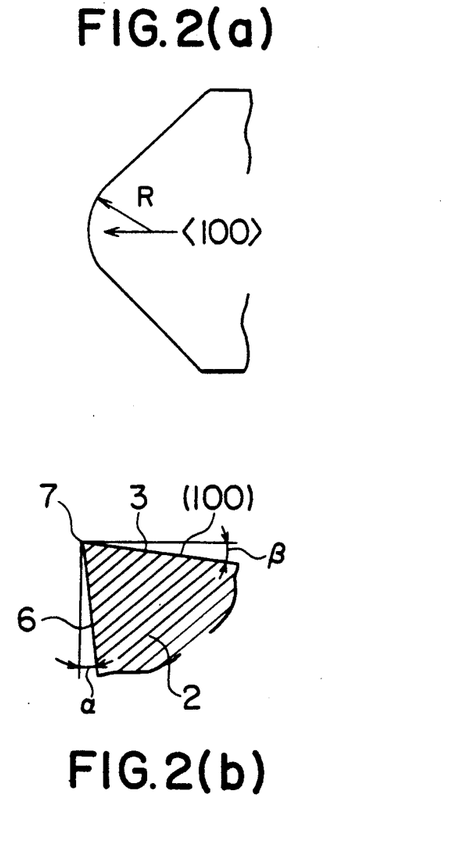

Using a synthetic diamond single crystal containing 10 ppm of boron and synthetic diamond single crystal containing no boron, precision cutting tools with a rake angle β of 2°, relief angle α of 5°, nose R of 1 mm, rake face 3 orientation of (100) plane and edge direction of <100> were prepared as shown in FIGS. 2 (a) and (b) and then subjected to wet turning of the end surface of a workpiece of no oxygen-containing copper with an outer diameter of 150 mm, inner diameter of 20 mm and thickness of 10 mm under conditions of a cutting speed of 113 m/min (inner diameter)–848 m/min (outer diamter), depth of cut of 0.005 mm and feed of 0.02 mm/rev until the surface roughness became 0.2 μmRmax, after which the life of the tool was evaluated. The test results are shown in Table 2.

TABLE 2

| | Cutting Distance Until Expired (km) | |
|---|---|---|
| Test No. | Sample Containing 10 ppm B | Sample Containing No B |
| 1 | 1250 | 530 |
| 2 | 1000 | 320 |
| 3 | 1430 | 290 |
| 4 | 1320 | 480 |
| 5 | 1150 | 410 |
| Average | 1230 | 406 |

EXAMPLE 3

Figure 3A:
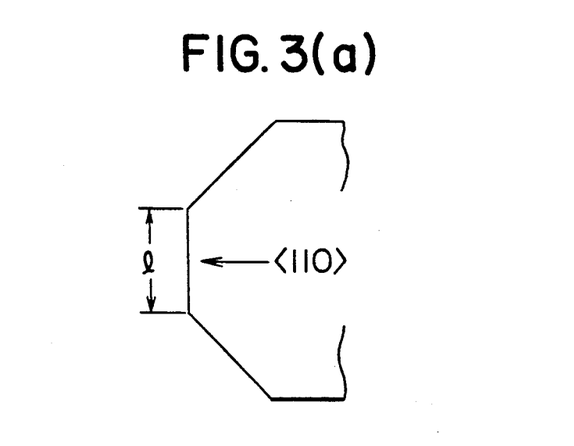
Figure 3B:
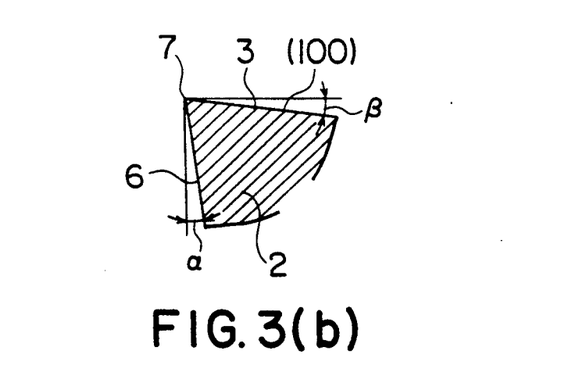
Figure 4:
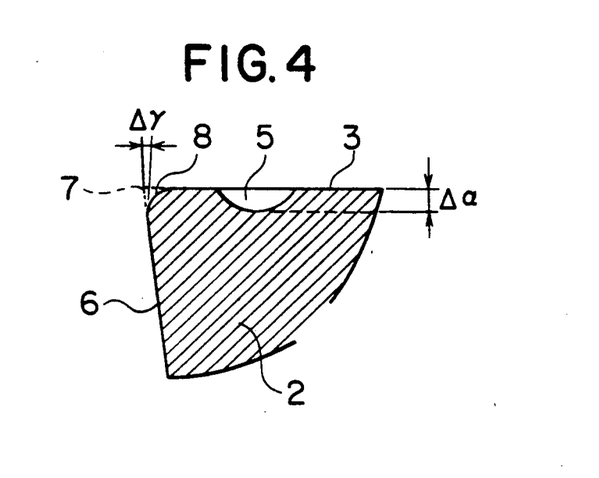
FIG. 4 is a cross-sectional view of a diamond cutting tool to illustrate the worn state thereof in Example 9.

Using a synthetic diamond single crystal containing 100 ppm of boron and synthetic diamond single crystal containing no boron superprecision cutting tools with a rake angle β of 2°, relief angle α of 5°, edge width 1 of 1.2 mm, rake face orientation of (100) plane and edge direction of <110> were prepared as shown in FIGS. 3 (a) and (b) and then subjected to wet turning of the end surface of a workpiece of aluminum alloy A 5086 (commercial name) with an outer diameter of 150 mm, inner diameter of 20 mm and thickness of 30 mm under conditions of a cutting speed of 113 m/min (inner diameter)–848 m/min (outer diameter), depth of cut of 0.01 mm and feed of 0.03 mm/rev to give a cutting distance of 200 km, after which wearing Δγ of the edge part and crater depth Δα of the rake face, as shown in FIG. 4, were measured. The test results are shown in Table 3:

TABLE 3

| | Wear Quantity of Edge of Cutting Tool | | | |
|---|---|---|---|---|
| | Sample Containing 100 ppm B | | Sample Containing No B | |
| Test No. | Δγ | Δα | Δγ | Δα |
| 1 | 0.05 | 0.1 | 0.30 | 1.5 |
| 2 | 0.07 | 0.2 | 0.45 | 1.9 |
| 3 | 0.06 | 0.1 | 0.32 | 3.0 |
| 4 | 0.10 | 0.3 | 0.21 | 1.8 |
| 5 | 0.09 | 0.3 | 0.29 | 2.7 |
| Average | 0.07 | 0.2 | 0.31 | 2.2 |

EXAMPLE 4

Using a synthetic diamond single crystal containing 0.05 ppm of boron and synthetic diamond single crystal containing no boron, super-precision cutting tools with a rake angle β of 2°, relief angle α of 5°, edge width 1 of 1.2 mm, rake face orientation of (100) plane and edge direction of <110> were prepared and then subjected to wet cutting of the end surface of a workpiece of no oxygen-containing copper with an outer diameter of 150 mm, inner diameter of 20 mm and thickness of 10 mm under conditions of a cutting speed of 113 m/min (inner diameter)–848 m/min (outer diameter), depth of cut of 0.01 mm and feed of 0.02 mm/rev until the surface roughness of the cut surface became 0.03 μm Rmax, after which the life of the tool was evaluated. The test results are shown in Table 4:

TABLE 4

| | Cutting Distance Until Expired | |
|---|---|---|
| Test No. | Sample Containing 0.05 ppm B | Sample Containing No B |
| 1 | 530 | 480 |
| 2 | 580 | 450 |
| 3 | 460 | 290 |
| 4 | 380 | 580 |
| 5 | 550 | 600 |
| Average | 500 | 480 |

EXAMPLE 5

Using 4 kinds of a synthetic diamond single crystal containing 10 ppm of nitrogen and 1 ppm of boron, synthetic diamond single crystal containing 0.5 ppm of nitrogen and 1 ppm of boron, synthetic diamond single crystal containing 10 ppm of nitrogen and 0.05 ppm of boron, and synthetic diamond single crystal containing 0.5 ppm of nitrogen and 0.05 ppm of boron, super-precision cutting tools with a rake angle β of 2°, relief angle α of 5°, nose R of 1 mm, rake face 3 orientation of (100) plane and edge direction of <100> were prepared as shown in FIGS. 2 (a) and (b) and then subjected to wet turning of the end surface of a workpiece of oxygen-free copper with an outer diameter of 150 mm, inner diameter of 20 mm and thickness of 10 mm under conditions of a cutting speed of 113 m/min (inner diameter)-848 m/min (outer diameter), depth of cut of 0.005 mm and feed of 0.02 mm/rev until the surface roughness of the cut surface became 0.2 μm Rmax, after which the life of the tool was evaluated. The test results are shown in Table 5:

TABLE 5

Cutting Distance Until Expired

| Test No. | Sample Containing 10 ppm N and 1 ppm B | Sample Containing 10 ppm N and 0.05 ppm B | Sample Containing 0.5 ppm N and 1 ppm B | Sample Containing 0.5 ppm N and 0.05 ppm B |
| --- | --- | --- | --- | --- |
| 1 | 1450 | 720 | 1200 | 510 |
| 2 | 1290 | 850 | 1130 | 340 |
| 3 | 1320 | 630 | 1090 | 300 |
| 4 | 1280 | 800 | 1210 | 450 |
| 5 | 1470 | 780 | 1050 | 400 |
| Average | 1362 | 756 | 1136 | 400 |

EXAMPLE 6

Using four kinds of materials, i.e. a synthetic diamond single crystal containing 50 ppm of nitrogen and 100 ppm of boron, synthetic diamond single crystal containing 50 ppm of nitrogen and 0.05 ppm of boron, synthetic diamond single crystal containing 0.5 ppm of nitrogen and 100 ppm of boron, and synthetic diamond single crystal containing 0.5 ppm of nitrogen and 0.05 ppm of boron, super-precision cutting tools with a rake angle β of 2°, relief angle α of 5°, edge width 1 of 1.2 mm, rake face orientation of (100) plane and edge direction of <110> were prepared as shown in FIGS. 3 (a) and (b) and then subjected to wet turning of the end surface of a workpiece of aluminum alloy A 5086 with an outer diameter of 150 mm, inner diameter of 20 mm and thickness of 30 mm under conditions of a cutting speed of 113 m/min (inner diameter)-848 m/min (outer diameter), depth of cut of 0.01 mm and feed of 0.03 mm/rev to give a cutting distance of 200 km, after which wearing Δγ of the edge part and crater depth Δα of the rake face, as shown in FIG. 4, were measured. The test results are shown in Table 6.

TABLE 6

Wear Quantity of Edge of Cutting Tool

| Test No. | Sample Containing 50 ppm N and 100 ppm B | | Sample Containing 50 ppm N and 0.05 ppm B | | Sample Containing 0.05 ppm N and 100 ppm B | | Sample Containing 0.5 ppm N and 0.05 ppm B | |
| --- | --- | --- | --- | --- | --- | --- | --- | --- |
| | Δγ | Δα | Δγ | Δα | Δγ | Δα | Δγ | Δα |
| 1 | 0.03 | 0.08 | 0.18 | 0.92 | 0.05 | 0.11 | 0.28 | 1.3 |
| 2 | 0.06 | 0.15 | 0.23 | 0.73 | 0.07 | 0.23 | 0.40 | 1.8 |
| 3 | 0.05 | 0.09 | 0.12 | 0.88 | 0.06 | 0.13 | 0.33 | 1.3 |
| 4 | 0.03 | 0.23 | 0.10 | 0.52 | 0.10 | 0.36 | 0.18 | 1.5 |
| 5 | 0.06 | 0.21 | 0.17 | 1.23 | 0.09 | 0.34 | 0.25 | 2.9 |
| Average | 0.05 | 0.15 | 0.16 | 0.86 | 0.07 | 0.23 | 0.29 | 2.2 |

EXAMPLE 7

Using 5 kinds of samples of synthetic diamond single crystals having varied contents of nitrogen and boron as shown in the following Table 7, super-precision diamond cutting tools 2 with a rake angle β of 0°, relief angle α of 5°, edge part 7 width 1 of 1.2 mm, R of edge part 7 at both ends of 0.4 mm, rake face 3 orientation of (110) plane and edge direction of <100> were prepared as shown in FIG. 1 and then subjected to wet turning of the end surface of a workpiece of aluminum alloy A 5086 with an outer diameter of 150 mm, inner diameter of 20 mm and thickness of 30 mm under conditions of a cutting speed of 113 m/min (inner diameter-)-848 m/min (outer diameter), depth of cut of 0.01 mm and feed of 0.03 mm/rev until the surface roughness of the cut surface became 0.04 μm Rmax, after which the life of the tool was evaluated.

As to each of these samples, the cutting distances until the lives of the five diamond cutting tools were expired and average values thereof, and the production costs of the synthetic diamond single crystals of the diamond cutting tools were compared, based on Sample No. 1 as one preferred embodiment of the present invention, to give results shown in Table 7:

TABLE 7

| Sample No. | Cutting Distance Until Expired (km) | | | | | | Comparison of Production Costs |
| --- | --- | --- | --- | --- | --- | --- | --- |
| | 1 | 2 | 3 | 4 | 5 | Average | |
| 1<br>N 30 ppm<br>B 50 ppm | 1050 | 1110 | 960 | 930 | 920 | 994 | 1 |
| 2<br>N 100 ppm<br>B 300 ppm | 890 | 930 | 1010 | 990 | 1080 | 980 | 3 |
| 3<br>N 200 ppm<br>B 0.05 ppm | 520 | 440 | 470 | 620 | 530 | 516 | 3 |
| 4<br>N no<br>B 50 ppm | 520 | 570 | 650 | 630 | 570 | 588 | 8 |
| 5<br>N no<br>B no | 400 | 430 | 490 | 250 | 300 | 374 | 10 |

EXAMPLE 8

Using 5 kinds of samples of synthetic diamond single crystals having varied contents of nitrogen and boron as shown in the following Table 8, super-precision diamond cutting tools 2 with a rake angle β of 2°, relief angle α of 5°, nose R of edge part 7 of 1 mm, rake face 3 orientation of (100) plane and edge direction of <100> were prepared as shown in FIG. 2 and then subjected to wet turning of the end surface of a workpiece of oxygen-free copper with an outer diameter of 150 mm, inner diameter of 20 mm and thickness of 10 mm under conditions of a cutting speed of 113 m/min (inner diameter)–848 m/min (outer diameter), depth of cut of 0.005 mm and feed of 0.02 mm/rev until the surface roughness of the cut surface became 0.2 μm Rmax, after which the lives of the tools were evaluated.

As to each of these samples, the cutting distances until the lives of the five diamond cutting tools were expired and average values thereof, and the production costs of the synthetic diamond single crystals of the cutting tools were compared, based on Sample No. 6 as one preferred embodiment of the present invention, in a similar manner to Example 7, thus obtaining results as shown in Table 8. Results of determining impurities contained in Sample No. 6 are shown in Table 9.

TABLE 8

| Sample No. | Cutting Distance Until Expired (km) | | | | | | Comparison of Production Costs |
|---|---|---|---|---|---|---|---|
| | 1 | 2 | 3 | 4 | 5 | Average | |
| 6 N 10 ppm B 1 ppm | 1450 | 1290 | 1320 | 1280 | 1470 | 1362 | 1 |
| 7 N 0.5 ppm B 800 ppm | 480 | 530 | 620 | 390 | 470 | 498 | 6 |
| 8 N 0.5 ppm B 0.05 ppm | 510 | 340 | 300 | 450 | 400 | 400 | 6 |
| 9 N 900 ppm B 800 ppm | 280 | 230 | 350 | 140 | 190 | 238 | 8 |
| 10 N 300 ppm B 0.2 ppm | 980 | 1400 | 1250 | 1310 | 1150 | 1218 | 4 |

TABLE 9

| Impurities Contained | Content (ppm) |
|---|---|
| Nitrogen | 10 |
| Boron | 1 |
| Iron | 1 |
| Nickel | 10 |
| Silicon | 0.5 |
| Cobalt | 0.1 |

EXAMPLE 9

Using 5 kinds of samples of synthetic diamond single crystals having varied contents of nitrogen and boron as shown in the following Table 10, super-precision diamond cutting tools 2 with a rake angle $\beta$ of 0°, relief angle $\alpha$ of 5°, edge part 7 width 1 of 1.2 mm, rake face 3 orientation of (100) and edge direction of <100> were prepared as shown in FIG. 3 and then subjected to wet turning of the end surface of a workpiece of the same material and dimensions as those of Example 7 under the same conditions as in Example 7 to measure wearing $\Delta\gamma$ of the edge part 7 and crater depth $\Delta\alpha$ of the rake face 3 as shown in FIG. 4 at a cutting distance of 200 km as to the five samples. The results are shown in Table 10. In addition, the production costs of these synthetic diamond single crystals were compared, based on Sample No. 11 as one preferred embodiment of a present invention, in the similar manner to Example 7, thus obtaining results as shown in Table 10.

TABLE 10

| Sample No. | $\Delta\gamma$ (upper column, mm) $\Delta\alpha$ (lower column, mm) | | | | | | Comparison of Production Cost |
|---|---|---|---|---|---|---|---|
| | 1 | 2 | 3 | 4 | 5 | Average | |
| 11 N 5 ppm | 0.04 | 0.03 | 0.06 | 0.05 | 0.06 | 0.05 | 1 |
| B 80 ppm | 0.10 | 0.13 | 0.22 | 0.15 | 0.20 | 0.16 | |
| 12 N 400 ppm | 0.05 | 0.08 | 0.04 | 0.06 | 0.08 | 0.06 | 5 |
| B 400 ppm | 0.06 | 0.07 | 0.18 | 0.14 | 0.30 | 0.15 | |
| 13 N 10 ppm | 0.29 | 0.51 | 0.45 | 0.38 | 0.40 | 0.41 | 3 |
| B 800 ppm | 0.71 | 0.58 | 0.81 | 0.67 | 0.78 | 0.71 | |
| 14 N 2 ppm | 0.04 | 0.07 | 0.09 | 0.08 | 0.07 | 0.07 | 5 |
| B 300 ppm | 0.13 | 0.15 | 0.17 | 0.13 | 0.19 | 0.15 | |
| 15 N 0.2 ppm | 0.45 | 0.74 | 0.66 | 0.68 | 0.56 | 0.62 | 7 |
| B 0.2 ppm | 1.02 | 0.95 | 0.88 | 1.10 | 1.08 | 1.01 | |

EXAMPLE 10

Figure 8:
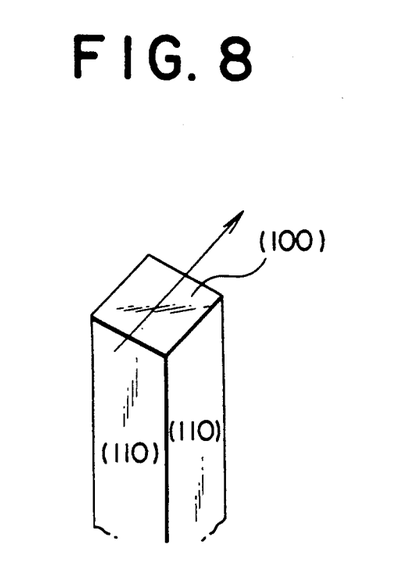
FIG. 8 is a perspective view of a diamond dresser composed of a diamond single crystal according to the present invention to show the orientation thereof and FIG. 9 is a similar perspective view of a diamond wire drawing die.

Using 5 kinds of samples of synthetic diamond single crystals having varied contents of nitrogen and boron as shown in the following Table 11, diamond dressers were prepared with the orientation shown in FIG. 8, in which an arrow shows the dressing direction, and then subjected to dressing of a grinding wheel of silicon carbide with a grain size of 400 mesh at a grinding wheel peripheral speed of 2000 m/min and dressing cut (depth of cut of dressing) of 0.02 mm/pass. After dressing 500 times, the wear quantity of diamond was determined.

As to each of these samples, the wear quantity of the single crystal diamond was determined and the production costs of the synthetic diamond single crystals were compared, based on Sample No. 1 as one preferred embodiment of the present invention, thus obtaining respectively results as shown in Table 11:

TABLE 11

| Sample No. | Wear Quantity of Diamond ($\times 10^{-3}$ mm$^3$) | | | | | | Comparison of Production Cost |
|---|---|---|---|---|---|---|---|
| | 1 | 2 | 3 | 4 | 5 | Average | |
| 1 N 30 ppm B 50 ppm | 5.2 | 3.3 | 6.5 | 4.6 | 4.7 | 4.9 | 1 |
| 2 N 100 ppm B 300 ppm | 6.5 | 6.6 | 5.7 | 4.4 | 3.2 | 5.3 | 3 |
| 3 | 10.1 | 9.9 | 11.3 | 10.7 | 9.7 | 10.3 | 3 |

TABLE 11-continued

| Sample No. | Wear Quantity of Diamond ($\times 10^{-3}$ mm$^3$) | | | | | | Comparison of Production Cost |
| --- | --- | --- | --- | --- | --- | --- | --- |
| | 1 | 2 | 3 | 4 | 5 | Average | |
| N 200 ppm<br>B 0.05 ppm<br>4 | 8.7 | 11.2 | 9.1 | 9.8 | 10.5 | 9.9 | 8 |
| N no<br>B 50 ppm<br>5 | 13.8 | 14.4 | 13.5 | 15.2 | 15.5 | 14.5 | 10 |
| N no<br>B no | | | | | | | |

EXAMPLE 11

Figure 9:
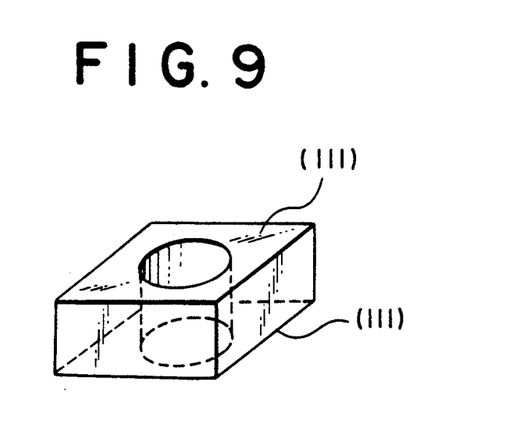

Using 5 kinds of samples of synthetic diamond single crystals having varied contents of nitrogen and boron as shown in Table 12, wire drawing dies were prepared with the orientation shown in FIG. 9 and then subjected to drawing of a copper wire of 0.08 mm in diameter, during which the quantity of the drawn wire was measured until the life of the die expired.

As to these samples, the quantity of the drawn wire by the three dies was determined and the production costs of the synthetic diamond crystals were compared, based on Sample No. 1 as one preferred embodiment of the present invention, thus obtaining respectively results as shown in Table 12.

TABLE 12

| Sample No. | Quantity of Drawn Wire (kg) | | | | Comparison of Production Costs |
| --- | --- | --- | --- | --- | --- |
| | 1 | 2 | 3 | Average | |
| 1<br>N 10 ppm<br>B 1 ppm | 920 | 830 | 1120 | 957 | 1 |
| 2<br>N 0.5 ppm<br>B 800 ppm | 520 | 630 | 490 | 547 | 6 |
| 3<br>N 0.5 ppm<br>B 0.05 ppm | 530 | 550 | 400 | 493 | 6 |
| 4<br>N 900 ppm<br>B 800 ppm | 350 | 520 | 290 | 387 | 8 |
| 5<br>N 300 ppm<br>B 0.2 ppm | 860 | 790 | 1050 | 900 | 4 |

What is claimed is:

1. A cutting tool comprising a shank to which a blank is fixed, wherein the blank is shaped in an edge by polishing a synthetic diamond single crystal containing 3 to 100 ppm of nitrogen and 0.1 to 100 ppm of boron.

2. A wire drawing die wherein the outer circumference of a blank is fixed to a metallic support, the blank being shaped in the die shape by polishing a synthetic diamond single crystal containing 3 to 100 ppm of nitrogen and 0.1 to 100 ppm of boron.

3. A dresser wherein a blank is fixed to a metallic support by burying the blank therein, the blank being shaped in a desired shape by polishing a synthetic diamond single crystal containing 3 to 100 ppm of nitrogen and 0.1 to 100 ppm of boron.

* * * * *